UNITED STATES PATENT OFFICE.

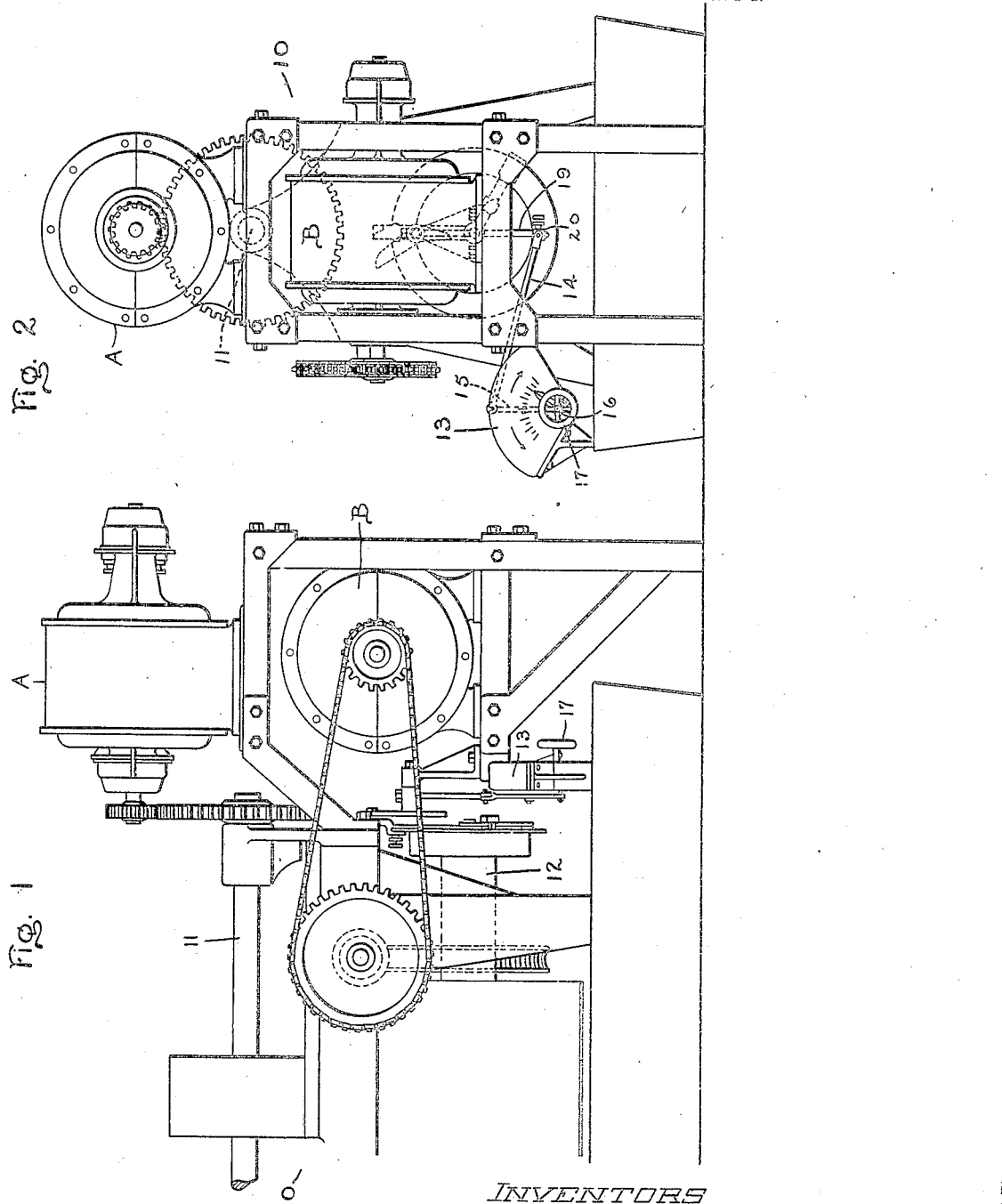

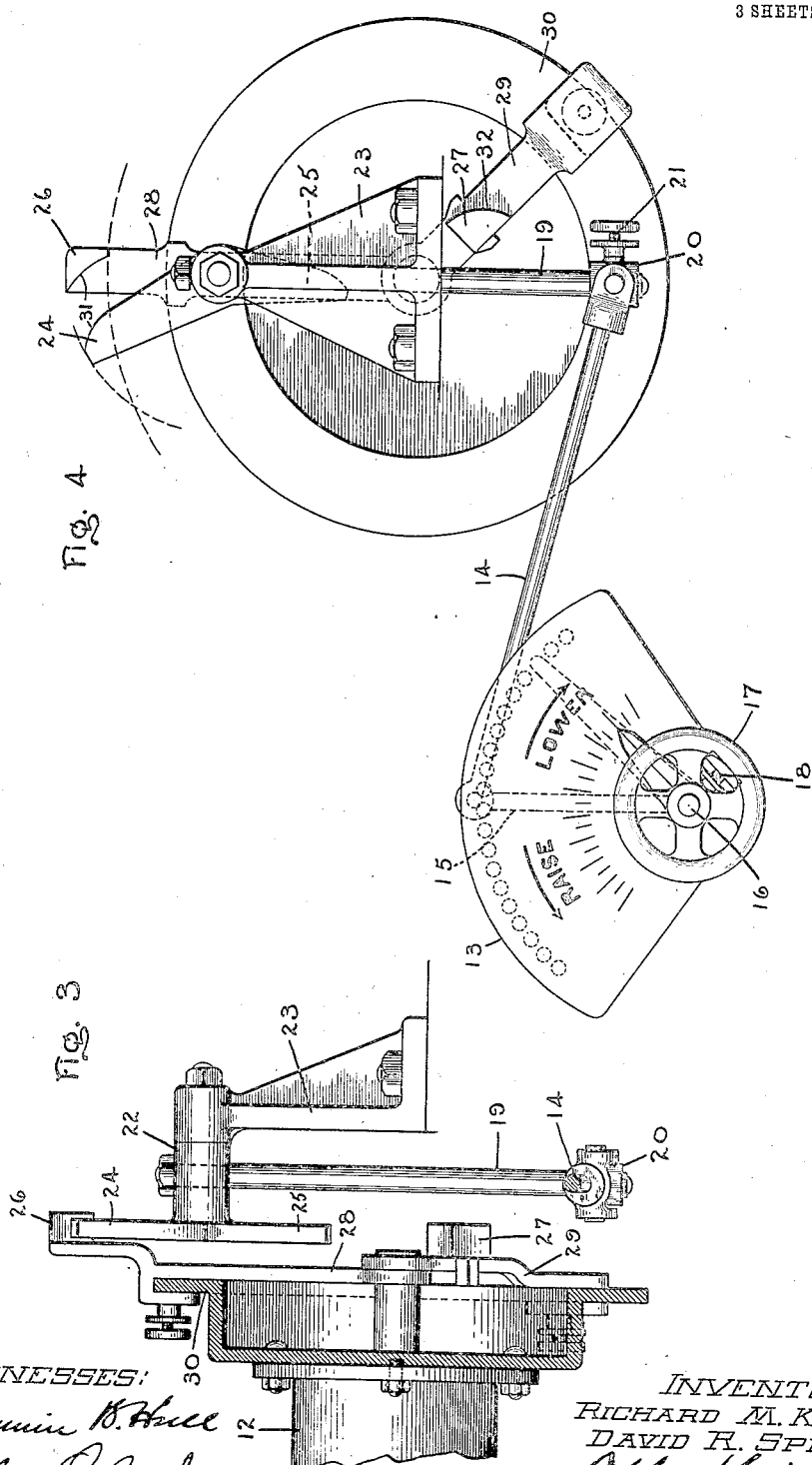

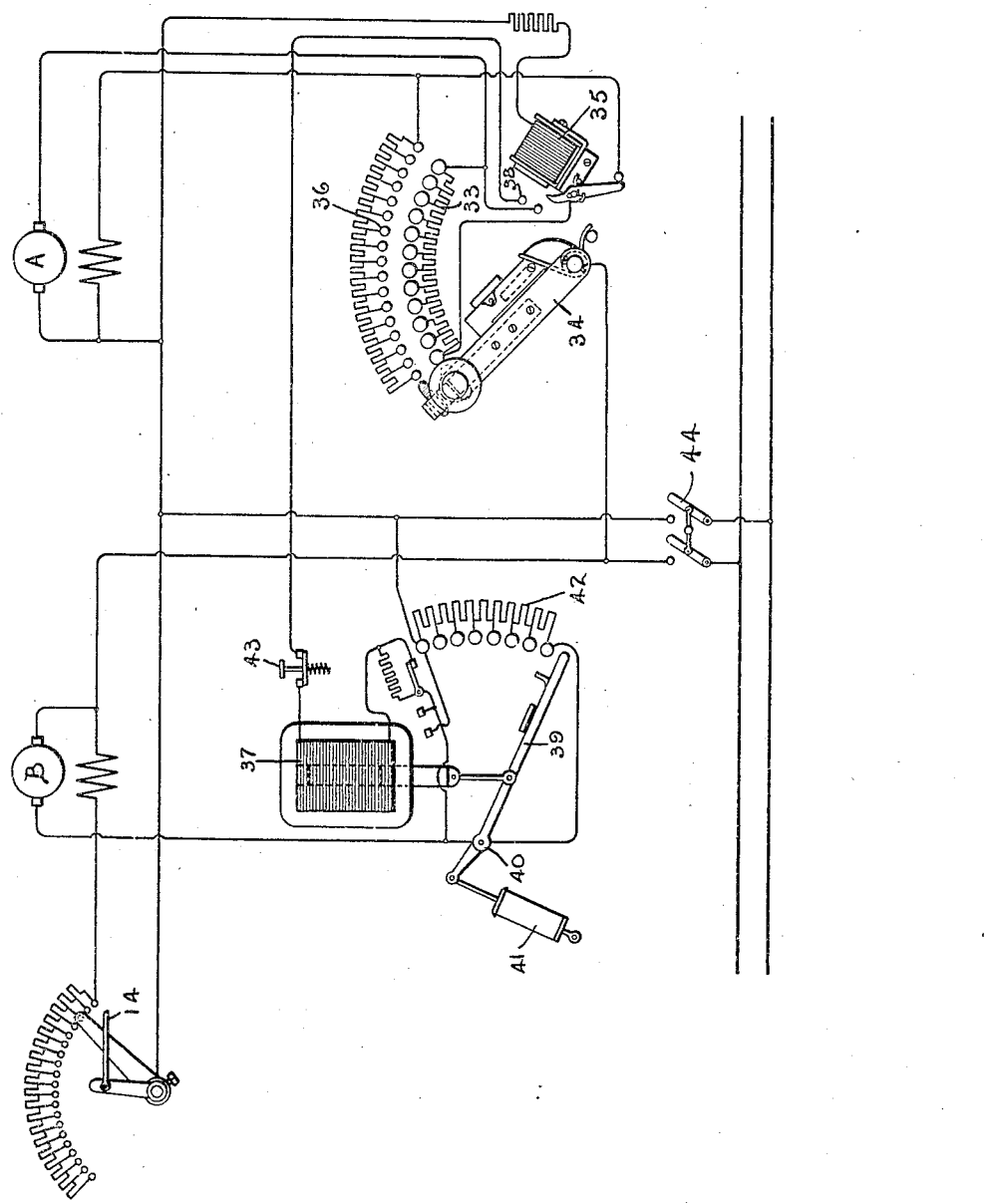

RICHARD M. KLEIN AND DAVID R. SPERRY, OF MADISON, WISCONSIN, ASSIGNORS TO NORTHERN ELECTRICAL MANUFACTURING COMPANY, A CORPORATION OF WISCONSIN.

MOTOR-CONTROLLING DEVICE.

No. 925,108.  Specification of Letters Patent.  Patented June 15, 1909.

Application filed March 23, 1908. Serial No. 422,760.

*To all whom it may concern:*

Be it known that we, RICHARD M. KLEIN and DAVID R. SPERRY, citizens of the United States, residing at Madison, county of Dane, State of Wisconsin, have invented certain new and useful Improvements in Motor-Controlling Devices, of which the following is a specification.

This invention relates to devices for controlling electric motors and has for its object the provision of means whereby a motor may be started, stopped and regulated in speed in a reliable and efficient manner.

Our invention relates more specifically to the controlling of motors used in connection with automatic machines, the speed of which is to be automatically varied. It is particularly applicable to automatic machine tools in which the speed of a moving element is to be varied within a definite range as the element makes a predetermined movement.

One of the objects of our invention is to provide means whereby the rotating element of a machine, as for instance a cam shaft, will be varied from one speed to another and back to the original speed during a complete revolution of the cam shaft.

Other objects of our invention will appear in the course of the following specification in which we have shown our invention embodied in concrete mechanisms for purposes of illustration.

Referring to the drawings, Figure 1 is a side elevation of a machine having our invention applied thereto; Fig. 2 is an end elevation of the same; Fig. 3 is a sectional view of the mechanism for shifting the resistance; Fig. 4 is a side view of the same; and Fig. 5 is a diagram of the circuit connections.

Referring to the drawings, 10 represents a machine tool, the speed of certain parts of which is to be automatically varied. The particular machine tool herein shown is a screw machine adapted to be driven by two motors A and B. The motor A is for the main drive of the machine whereas the motor B is adapted to drive the cam shaft. In a machine of this type the main drive has a constant speed for a given work while the speed of the cam shaft is automatically varied. The motor A in this case is geared to drive the main shaft 11 and the motor B the cam shaft 12. In the driving of the cam shaft it is not only necessary that it automatically change from one speed to another but it is also necessary that the extent of the change or interval between the changes be varied at will. In order to accomplish this change in speed, a rheostat 13 is arranged in circuit with the motor B preferably in the field circuit. The controlling arm of this rheostat is operated by means of a connecting rod 14 secured at one end to an arm 15 pivoted at the central stud 16 of the rehostat. The controlling arm is made adjustable with reference to the arm 15 by means of a handle 17 and a set screw 18 so that the arm may be left in any desired position to vary the range of movement of the controlling arm. The opposite end of the connecting rod 14 is pivoted to a rod 19 and is made adjustable by means of a sleeve 20, to which the arm is pivoted, and a set screw 21. This rod is secured to a rocker arm 22 rotatably mounted in a bracket 23. This rocker arm has two projecting fingers 24 and 25 which are adapted to be engaged and swing the arm 19 to adjust the resistance and vary the speed of the motor B. The fingers are arranged to be actuated by means of projecting lugs 26 and 27 rotatable with and adjustable with reference to the cam shaft 12. These lugs form the ends of arms 28 and 29 pivoted centrally of the cam shaft and secured thereto by means of a flanged member 30 with which they may be adjusted as shown. The engaging surfaces between the fingers and the lugs are of involute shape so that throughout the range of contact there will be no rubbing but merely rolling friction. The result which it is desired to produce is that for one complete revolution of the shaft 12 a certain speed will be maintained for a given portion of the revolution and then automatically changed to another so that a predetermined speed shall be maintained for the remaining portion thereof. When the entire revolution has been completed the speed must again be changed to the first speed. It will be seen that when the cam shaft 12 rotates to a certain position in its revolution, the lug 26 will engage the finger 24 and carry it along for a definite period, the surfaces 31 rolling upon each other. The arm 28, having a longer radius than the finger 24 the surfaces will be disengaged after a definite length of travel. This movement of the finger 24 shifts the controlling arm of the rheostat a definite amount, depending upon the position of the sleeve 20 upon the rod 19. The particular part of the rheostat which the controlling arm moves over may be varied by the handle 17. After the finger leaves the lug 26, the cam shaft continues to revolve at the changed speed until the engaging surface 32 of the lug 27 engages the finger 25, and the controlling arm will be moved back to its original position. Thus for a single rotation of the cam shaft the speed has been varied from the starting speed to a predetermined speed and back again.

In Fig. 5 we have shown the arrangement of circuits whereby the motors A and B are started and controlled. The motor A is adapted to be started manually by means of a starting resistance 33, which is cut out by the spring-returned strating arm 34 and held in running position by the no-voltage magnet 35 in the usual way. The particular type of starting device used in starting this motor forms no part of our invention but for purposes of illustration we have shown a type of regulating rheostat shown and described in a patent to F. J. Seabolt, No. 852,851. In this type of starter as the controlling mechanism is moved in a clockwise direction, the resistance is cut out of the armature circuit until running position is reached and upon moving the mechanism in a counter-clockwise direction, field resistance is inserted to vary the speed of the motor. In this case the speed of the motor A is varied by means of the studs 36 as the arm is returned. When the starting arm reaches running position, the solenoid 37 is energized through stud 38. When the solenoid actuates the controlling arm 39 pivoted at 40 against the retardation of the dash-pot 41 to cut out resistance 42 from the armature circuit of motor B, the latter is automatically started after motor A is brought up to running speed. The speed of the motor B is then automatically varied by means of the connecting rod 14 in the manner above described. The motor B may be stopped and started at any time by actuating the push button 43. It will thus be seen that upon the closing of the line switch 44 the motor A will be started and brought up to running speed at which point the motor B will likewise be automatically started and brought to its running speed, which speed will depend upon the position of the controlling arm 15 of the rheostat. The speed of the motor A may then be varied at will by means of the resistance 36.

While we have described our invention as adapted to a particular form of mechanism and arranged to operate in a certain specific way, it should be understood that we do not limit our invention to the particular construction, arrangement and application herein shown and described except in so far as it is limited by the scope of the claims annexed hereto.

What we claim as new and desire to secure by Letters Patent of the United States, is,—

1. The combination with an electric motor driven machine, of means for automatically varying said motor from one operating speed to another and back again during a predetermined movement of said machine.

2. The combination with the rotating element of a machine and an electric motor for driving the same, of means for automatically varying said motor from one operating speed to another and back again during a revolution of said member.

3. The combination with the rotating element of a machine and an electric motor for driving the same, of means for automatically varying said motor from one speed to another and back again during a revolution of said element, and means for changing the range of said speed variation.

4. The combination with the rotating element of a machine and an electric motor for driving the same, of means for automatically varying said motor from one speed to another and back again during a revolution of said element, and means for changing the position at which the speed is varied.

5. The combination with the rotating element of a machine and an electric motor for driving the same, of means for automatically varying said motor from one speed to another and back again during a revolution of said element, means for changing the position at which the speed is varied, and means for changing the range of said speed variation.

6. The combination with a machine having independently actuated coöperating elements, of an electric motor for driving each of said elements, a manually operated starting device for one of said motors, and means for automatically starting the other of said motors when the manual starting device reaches a predetermined position.

7. The combination with an electric motor driven machine, of an automatic starting device for said motor, and means for automatically varying said motor from one operating speed to another and back again during a predetermined movement of said machine.

8. The combination with the rotating element of a machine and an electric motor for driving the same, of an automatic starting device for said motor, and means for automatically varying said motor from one operating speed to another and back again during a revolution of said element.

9. The combination with a machine having independently actuated coöperating elements, of an electric motor for driving each of said elements one of which rotates at a constant speed, and means for automatically varying the other of said motors from one speed to another and back again during a predetermined movement of the element driven by said second motor.

10. The combination with a machine having independently actuated coöperating elements, of an electric motor for driving each of said elements one of which rotates at a constant speed, and means for automatically varying the other of said motors from one speed to another and back again during a rotation of the element driven thereby.

11. The combination with a machine tool having independently rotated coöperating elements, of an electric motor for each of said elements one of which rotates at a constant speed, a rheostat in circuit with the other motor, and means for automatically varying the resistance in said rheostat to cause the motor to rotate at one speed during a portion of a revolution of the element driven thereby and at a different speed during the remainder of said revolution.

12. The combination with a machine tool having independently rotated coöperating elements, of an electric motor for each of said elements one of which rotates at a constant speed, a rheostat in circuit with the other motor, means for automatically varying the resistance in said rheostat to cause the motor to rotate at one speed during a portion of a revolution of the element driven thereby and at a different speed during the remainder of said revolution, and means for changing the range of said resistance variation.

13. The combination with a machine tool having independently rotated coöperating elements, of an electric motor for each of said elements one of which rotates at a constant speed, a rheostat in circuit with the other motor, means for automatically varying the resistance in said rheostat to cause the motor to rotate at one speed during a portion of a revolution of the element driven thereby and at a different speed during the remainder of said revolution, means for changing the range of said resistance variation, and means for changing the position at which the speed is varied.

14. The combination with a machine tool having independently actuated coöperating elements, of an electric motor for each of said elements, a starting device for one of said motors, an automatic device for starting the other of said motors arranged to be operated when said first starting device reaches running position, a rheostat for varying the speed of said second motor, and means for actuating said rheostat to cause the motor to rotate at one speed during a portion of a revolution of the element driven thereby and at a different speed during the remainder of said revolution.

15. The combination with a machine tool having independently rotated coöperating elements, of an electric motor for each of said elements, a starting device for one of said motors, an automatic device for starting the other of said motors arranged to be operated when said first starting device reaches running position, a rheostat for varying the speed of said second motor, means for actuating said rheostat to cause the motor to rotate at one speed during a portion of a revolution of the element driven thereby and at a different speed during the remainder of said revolution, and means for changing the position at which the speed is varied.

In witness whereof, we have hereunto set our hands this 9th day of March, 1908.

RICHARD M. KLEIN.
DAVID R. SPERRY.

Witnesses:
A. J. BUENZLI,
J. W. FRENZ.